United States Patent [19]
Fowler

[11] 3,814,031
[45] June 4, 1974

[54] PLASTIC PALLETS
[75] Inventor: Timothy J. Fowler, St. Louis, Mo.
[73] Assignee: Monsanto Company, St. Louis, Mo.
[22] Filed: May 26, 1972
[21] Appl. No.: 257,268

[52] U.S. Cl. .................................. 108/51, 108/58
[51] Int. Cl. ........................................ B65d 19/00
[58] Field of Search ............................ 108/51-58

[56] References Cited
UNITED STATES PATENTS

| | | | |
|---|---|---|---|
| 3,140,672 | 7/1974 | De Luca | 108/58 |
| 3,167,341 | 1/1965 | Higgins | 108/58 X |
| 3,187,689 | 6/1965 | Hess | 108/58 |
| 3,228,358 | 1/1966 | Sepe et al. | 108/58 |
| 3,359,929 | 12/1967 | Carlson | 108/58 |
| 3,424,110 | 1/1969 | Toot | 108/53 |
| 3,433,184 | 3/1969 | Addy | 108/53 |
| 3,434,434 | 3/1969 | Horton, Jr. | 108/51 |
| 3,467,032 | 9/1969 | Rowlands et al. | 108/51 |
| 3,511,191 | 5/1970 | Barry, Jr. et al. | 108/58 |
| 3,563,184 | 2/1971 | Angelbeck | 108/51 |
| 3,611,952 | 10/1971 | Hoffman | 108/51 |
| 3,675,595 | 7/1972 | Sullivan | 108/58 |
| 3,695,188 | 9/1972 | Granoutstein | 108/58 |
| 3,699,901 | 9/1972 | Cook | 108/58 |
| 3,699,902 | 9/1972 | Allgeyer | 108/58 |

FOREIGN PATENTS OR APPLICATIONS
1,090,759   11/1967   Great Britain ..................... 108/51

*Primary Examiner*—Paul R. Gilliam

[57] ABSTRACT

A hollow molded unitary plastic pallet is provided for use in handling and transporting cargo, particularly with forklift trucks. The pallet comprises upper and lower surfaces with legs disposed on the lower surface. Reinforcement of the pallet is achieved by means of holes through the pallet surfaces and by means of reinforcing grooves disposed on the legs and on the lower surface of the pallet. The grooves on the lower surface extend from the holes to the legs and continue down along the length of the legs to their bases.

2 Claims, 3 Drawing Figures

PLASTIC PALLETS

BACKGROUND OF THE INVENTION

This invention pertains to pallets useful in material handling, particularly to one-piece plastic pallets designed for use with forklift equipment.

For a number of years, wooden pallets have been a mainstay of the material handling business. In the past, wooden pallets have provided advantages of economy, simplicity and durability, principally because of the lack of other suitable materials. With the growth in the plastics industry, a wide variety of plastic materials have been investigated to determine their suitability for use as a pallet material. By comparison with wood, plastics offer the advantages of cleanliness and cleanability. Many plastics, moreover, can also be manufactured into pallets in a single molding operation, thereby avoiding costly hand labor in their fabrication. The molding operation also affords an opportunity to include design features in the pallet for various reasons. Improved stacking of empty pallets, reinforcement and resistance to damage are some of the goals which can be attained through special designs of plastic pallets.

Because of the capability of plastic materials to provide certain advantages over conventional wood and metal pallets, standards have been adopted by some organizations which require highly specialized properties. In the food and pharmaceutical processing industries, for example, cleanliness and cleanability are important. A pallet which can be steam-cleaned to provide a surface suitable for direct contact with unpackaged food is a desirable article. Resistance to chemicals such as detergents, acid foodstuffs, fish oils and vegetable oils is also important. Capability to withstand rough treatment without developing splinters or broken edges or corners is desirable in any application, including food and pharmaceutical business. Light weight and termperature resistance are two more attributes desirable and attainable in plastic pallets.

Providing a plastic pallet light in weight, durable, easily cleaned, capable of supporting heavy loads and of being used with forklift equipment constitutes one of the principal objects of this invention. A specific object is to provide a pallet of the above type which is preferred for use within the food and pharmaceutical processing industries.

SUMMARY OF THE INVENTION

This invention is directed to hollow unitary plastic pallets comprising a. an upper surface;
b. a lower surface;
c. an exterior edge wall extending between said upper surface and said lower surface and connecting the two surfaces;
d. legs integrally associated with said lower surface and extending downwardly from said lower surface;
e. an interior support member extending between and connecting said upper and lower surfaces, said member being located within the perimeter of said exterior edge wall;
f. reinforcing grooves disposed on said lower surface extending from said interior support member to said legs;
g. reinforcing grooves disposed on said lower surface extending from a leg located in proximate relationship to said exterior edge wall to an adjacent leg also located in proximate relationship to said exterior edge wall;
h. reinforcing grooves disposed on said lower surface extending from one interior side of said legs to an adjacent interior side of the same leg, and
i. reinforcing grooves diposed on said legs extending from said lower surface to the base of said legs.

DESCRIPTION OF THE PREFERRED EMBODIMENTS

Figure 1:
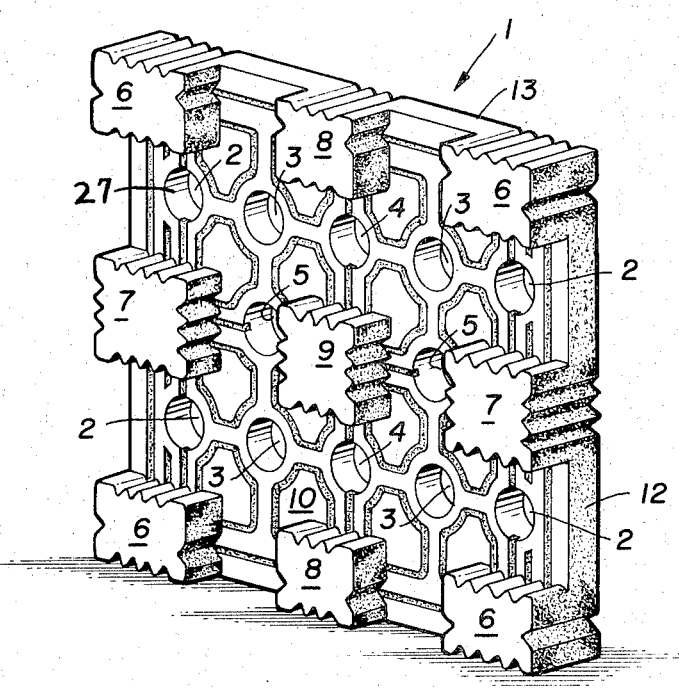
FIG. 1 is a perspective view of the bottom and two sides of the same pallet.
Figure 2:
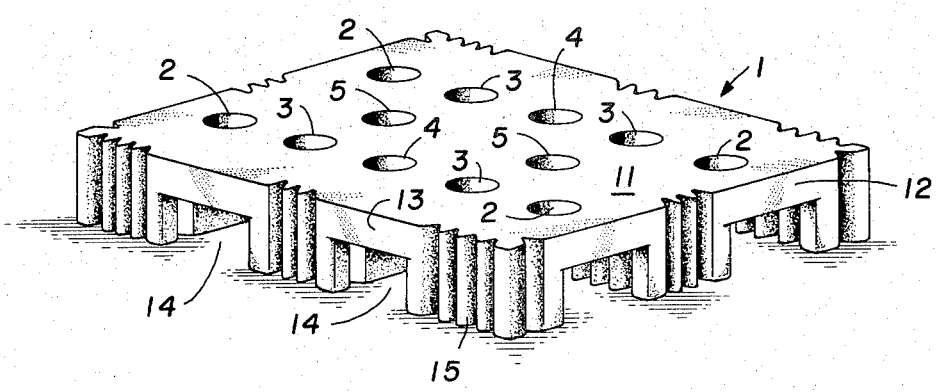
FIG. 2 is a perspective view of the top and two sides or a pallet within the scope of this invention.
Figure 3:
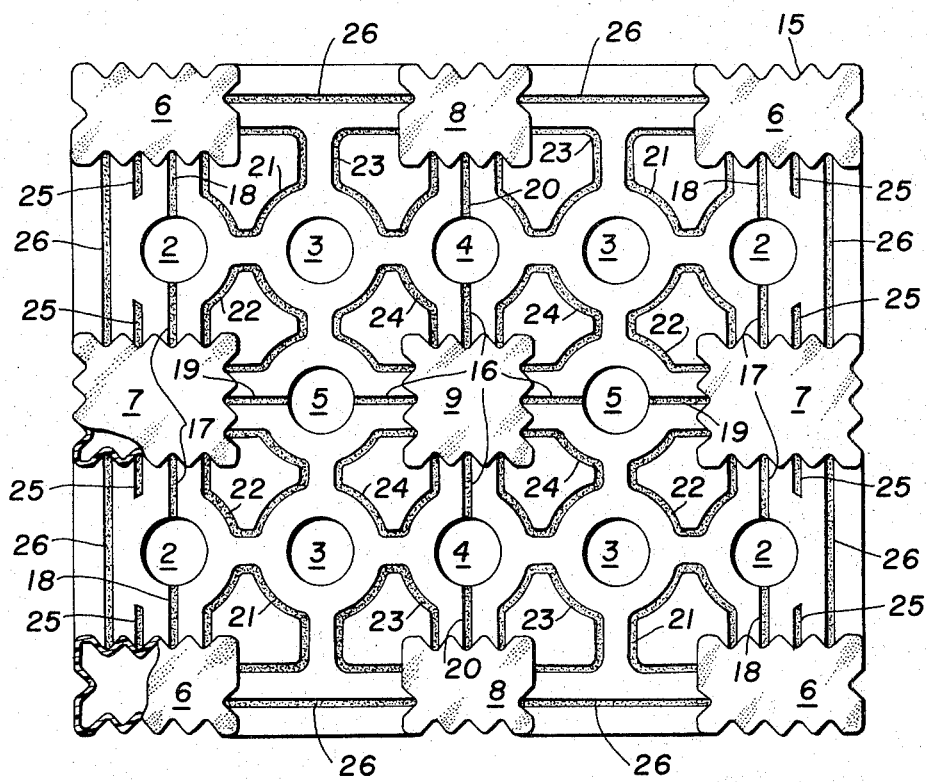
FIG. 3 is a bottom plan view of the pallet.

Referring to the drawings, a pallet 1 is shown having an upper surface 11 and a lower surface 10 joined together by exterior side edge walls 13 and exterior front and back edge walls 12 to form a hollow unitary structure. The legs 6, 7, 8 and 9 of the pallet are designed and proportioned to permit the tines of a forklift truck to pass between the legs and under the lower surface of the pallet when the tines are inserted from at least one direction. Preferably the legs are so arranged that the pallet can be lifted by the forklift tines when inserted from any of a number of directions. In the case of square pallets, the legs are preferably arranged to accommodate the tines of a forklift inserted from any of the four sides of the pallet. The same is true of a rectangular, non-square pallet. To facilitate the description of rectangular non-square pallets, the longer sides of the pallets will be referred to as the front and back while the shorter sides will be referred to simply as the sides of the pallet. It is understood of course that the front, back and sides of a square pallet will be identical. In the accompanying drawings, the rectangular pallet has four corner legs 6, two front and back legs 7, two side legs 8 and a center leg 9. Positioned between each corner leg 6 and front or back leg 7 is a front or back hole 2. Side holes 3 are positioned in each of the four areas bounded by a corner leg 6, front or back leg 7, side leg 8 and center leg 9. Central side holes 4 are positioned in the area between the center leg 9 and each side leg 8. Central holes 5 are positioned in the area between center leg 9 and each of the front and back legs 7. All of the holes are bounded by interior walls 27 connecting the upper surface 11 and lower surface 10. The interior walls serve as interior support members maintaining suitable spacing between the upper and lower surfaces. Along the lengths of all of the legs 6, 7, 8 and 9 are reinforcing grooves 15 extending from the upper surface 11 of the pallet to the base of the leg. Inasmuch as the legs 6, 7 and 8 are integrally associated with the lower surface 10 and exterior edge walls 12 and 13, the reinforcing grooves 15 are also integrally associated with the legs and an exterior edge wall. On the lower surface 10 are a number of additional reinforcing grooves. Some of the grooves extend from the various holes to the legs and down the lengths of the legs to their bases. Other grooves extend circuitously from one side of a leg, along the perimeter of adjacent holes, and back to another side of the same leg. A third type of groove extends along the lower surface of the pallet parallel to the edge walls from one leg located on the edge of the pallet to an adjacent leg also located on the edge of the pallet. Still another type of groove extends from the corner legs and front and back legs and terminates without contacting any other element of the pallet. Extending from each central hole 5 is a reinforcing groove 19 extending to the adjacent front or back leg 7 and along the vertical length of the leg 7 to the lower surface 10, and another reinforcing groove 16 extending from the same central hole 5 to the center leg 9 and along its vertical length to the pallet lower surface 10. Reinforcing grooves 16 also extend from central side holes 4 to the center leg 9 and along the leg to the lower surface 10. From each side leg 8 a reinforcing groove 20 extends to the adjacent central side hole 4. Two reinforcing grooves 17 extend from each front and back leg 7 to the adjacent front or back hole 2. And from each corner leg 6 a reinforcing groove 18 extends to the adjacent front or back hole 2. Reinforcing grooves 26 extend from each conrer, side, front and back leg 6, 7 and 8 to the adjacent corner, side, front or back leg 6, 7, or 8 parallel to and close to the exterior edge walls 12 and 13. From each corner leg 6 a reinforcing groove 21 extends from one interior side of said leg parallel to groove 26, then at a right angle toward side hole 3, circuitously adjacent to but not in immediate contact with the perimeter of hole 3, then circuitously adjacent to but not in immediate contact with a front or back hole 2, and finally parallel to groove 18 back to the adjacent interior side of the same corner leg 6. By "interior side" of a leg is meant that side of the leg which is not integrally associated with the exterior edge walls 12 and 13. From each of the front and back legs 7 there are two reinforcing grooves 22 which extend from the interior side of the leg facing the central hole 5 parallel to groove 19, then around holes 5, 3 and 2 in the same manner that groove 21 passed around holes 3 and 2, and finally parallel to groove 17 back to an adjacent side of leg 7. From each side leg 8 there are two reinforcing grooves 23 which extend from the interior side of the leg facing the central side holes 4 parallel to groove 20, then around holes 4 and 3 in the same manner that groove 21 passed around holes 3 and 2, then parallel to groove 21, then at a right angle and parallel to groove 26 back to an adjacent interior side of leg 8. From the center leg 9 four reinforcing grooves 24 extend from each of the four sides of the leg parallel to groove 16, then around holes 5, 3 and 4 in the same manner that groove 21 passed around holes 3 and 2, then parallel to another groove 16 and back to an adjacent side of leg 9. Finally grooves 25 extend from legs 6 and 7 toward each other parallel to groove 26 and terminate in the lower surface 10 without contacting any other element in the pallet.

Except for the junction where groove 21 leaves leg 6, all of the grooves described above which contact a leg travel along the vertical length of the leg to the base of the leg. On leg 6, the one junction with groove 21 is not extended down the leg because of the limited space available to accommodate such a groove. Different dimensions of the pallet, groove or leg would readily permit the groove to be extended in the same manner as the other grooves. Similarly because of dimensional restrictions, grooves 25 extending toward each other from legs 6 and 7 are not joined. If they were joined, the modified groove would either pass too closely to hole 2 or too closely to groove 26, with a resultant weakening of the pallet in that area instead of strengthening. With different pallet or groove dimensions or hole placement or dimension, a groove such as groove 25 could readily be extended continuously from leg 6 to leg 7.

The dimensions and structural details of the pallets can vary within fairly wide limits. The interior support members are readily included in the pallet in the form of interior walls which circumscribe apertures in the pallet surfaces. The apertures or holes can be as few as one, preferably at least about four, and as many as 16 or 20. The apertures will usually number from about four to 16, with eight apertures being preferred. The sizes and shapes of the apertures can also vary considerably depending upon load requirements, the total number of apertures, size and shape of the pallet, size and placement of the legs and the placement of the reinforcing grooves on the lower surface of the pallet. For pallets with 12 to 15 square feet of load-bearing surface containing eight circular holes, holes having diameters of 6 inches are satisfactory. Depending upon a variety of other factors, apertures can vary from 2 inches or less up to about 12 inches or more in their smallest dimension. The apertures in the pallet surfaces serve a multiple purpose. First the apertures, together with their interior walls connecting the upper and lower pallet surfaces, provide reinforcement of the pallet by supplying additional support elements between the upper and lower surfaces, thereby transferring stresses from the upper pallet surface to the lower surface. Secondly, the apertures provide means for permitting fluids such as water, grease, cooking oil and the like to run off the surface. The apertures also facilitate ventilation and air flow around certain materials transported on the pallets such as cooked food, fresh fruit and vegetables and flowers. Prompt freezing of other foods such as ice cream is also facilitated by the presence of the ventilating apertures.

The number of legs on the pallet can vary from a minimum of two up to any reasonable maximum of 15 or 20 or more. Considering both structural design limitations as well as economies in the molding operation, the number of legs is preferably from about 4 to about 12, and most preferably nine. The lengths of the legs from the lower surface of the pallet to the base of the legs should be at least about 3 inches if the pallet is to be used with forklift equipment to permit the tines of the forklift truck to pass under the pallet easily. Preferably, the legs will be from about 3.5 to about 8 inches long and more preferably about 4 to 6 inches. The openings between the legs can also vary substantially from no opening in the case of one continuous leg spanning one entire side of a pallet, up to 36 inches or more. Preferably the openings between the legs are at least 3.5 or 4 inches up to about 18 or 24 inches.

The placement of the legs can vary somewhat, particularly the placement of the legs along the perimeter of the pallet, i.e. the legs in proximate relationship to the exterior edge walls, more specifically legs 6, 7 and 8. Maximum reinforcement can usually be attained by placing the legs 6, 7 and 8 so that the exterior side of the legs forms a continuous planar surface with the exterior edge walls 12 and 13. But additional carrying surface can be provided by extending the pallet surfaces slightly beyond the exterior sides of the legs to form an overhang. Depending upon whether a large pallet surface or a strong, load-carrying pallet is more important, either of the two alternatives can be employed.

Regarding the pallet surfaces, they can be one-sixteenth inch or less up to 1 inch or more in thickness, depending upon the maximum load the pallet is designed to sustain. Pallets capable of carrying loads of 4 to 5 pounds per square inch can be designed with upper and lower surfaces of one-eighth inch thicknesses. It is often convenient to make hollow pallets with all wall thicknesses, including the legs and exterior edge wall, identical. For certain applications, however, it may be desirable to manufacture the pallet with some wall thicker than others. As an example, the upper and lower surfaces of a pallet can be molded one-eighth inch thick and the walls of the legs much thicker such as one-half inch or more.

The grooves along the exterior sides of legs 6, 7 and 8 are preferably but not necessarily extended to the upper surface of the pallet. If the legs are positioned so that their exterior edges are planar with the exterior edge walls, the extension of the grooves to the upper surface is preferred. If the legs are located inwardly from the exterior edge walls, continuation of the grooves can readily be employed or not employed, depending upon other design considerations.

In the accompanying drawings, the placement of the reinforcing grooves is limited to the lower surface of the pallet and to the sides of the legs. It is of course possible and entirely within the scope of this invention to include reinforcing grooves or ridges in or upon the upper surface of the pallet as well as the lower surface. One of the desirable features, however, of a preferred type of pallet is the smooth upper surface of that pallet, free from grooves, protrusions and other surface irregularities. The planar upper surface is particularly desirable for use in the food and pharmaceutical processing industries because the planar surface cleans more easily and also because the surface is less likely to retain dirt, grease, food particles and the like than a surface with a pluraity of grooves, recesses and ridges.

The thickness of the pallet, that is the distance between the exterior surfaces of the upper and lower pallet surfaces, can also vary widely from a mere fraction of an inch to several inches. For pallets with about 12 to 16 square feet of load-bearing area with wall thicknesses of about one-sixteenth to one-fourth inch and load-bearing capacities of 6 to 10,000 pounds, a thickness of about 1 to about 4 inches has proved satisfactory although thicknesses greater or smaller can be employed. Load-bearing capacities can be increased by using pallet thicknesses of 2 to 6 inches in combination with certain other design details. As a result, there is no practical limit which can be imposed on pallet thicknesses.

The dimensions of the reinforcing grooves constitute an important variable of the pallets of this invention. Depending upon the thickness of the pallet and of the legs, the grooves can be either shallow or deep. The grooves can moreover vary in width and depth depending upon their location on the pallet. In a typical 14 square foot pallet with a thickness of 3 inches, grooves 2 inches deep and 2 inches wide are acceptable. As an alternative, the horizontal grooves in the lower surface of the pallet could be 2 inches deep and 2 inches wide with vertical grooves in the legs being as much as 1 inch or more shallower or deeper or wider or narrower. Another alternative could be to make all the grooves, horizontal and vertical, 2 inches deep and 1 inch wide. It can be appreciated, of course, that if the pallet thickness is 4 or 6 inches instead of 3 inches, the grooves can be made much deeper, thereby reinforcing the pallet even more than is possible with a pallet which is thinner.

The material from which the pallet can be made can be any of a large number of plastic materials. Both thermosetting as well as thermoplastic plastics can be used. Examples of suitable polymers include phenolic resins such as phenolformaldehyde, epoxies, melamineformaldehyde polyesters, polyethylene, polypropylene, nylon, acrylic resins, polystyrene, polyvinyl chloride and a number of other common and specialty plastics including copolymers and terpolymers such as ABS (acrylonitrile-butadiene-styrene polymer). In addition, the foregoing polymers can be modified with innumerable additives such as plasticizers, stabilizers, foaming agents, pigments, fillers and dyes to produce polymer materials with special or improved properties.

Depending upon the polymer material used in the pallet, the method of fabricating the pallet can be quite different. Injection molding is one method which is commonly used in the manufacture of thermoplastic materials. Other possible methods include extrusion followed by hot or cold stamping. In both an injection molding process and in a stamping process, it will be convenient to form the pallet in two halves and then join the halves to form a unitary structure. Many other processes could also employ the above technique. Included are blow molding, casting and thermoforming. Other processes such as casting and rotational molding can be used to manufacture a one-piece pallet in one step without the need for joining two or more portions together. Polyethylene, particularly the high-density type with a density of at least 0.94, is a material particularly preferred for use in the above-described pallets because of its combination of low cost, resistance to environmental use, easy moldability and good mechanical properties. When polyethylene is selected as the pallet material, rotational molding is one of the particularly preferred fabrication processes.

It should be understood that changes and modifications in the design of the pallet shown herein by rearrangement, elimination or addition to its component parts can be made without departing from the spirit of this invention. For instance, apertures without interior walls could be produced in a pallet and a plastic plug inserted in the pallet structure thereby eliminating the apertures while at the same time providing interior support between the upper and lower surfaces of the finished pallet. Or the apertures could be made very small in the pallet and filled or plugged with plastic material before use. Another modification would be the use of ridges instead of grooves to provide reinforcement in the finished pallet. Ridges used in such a manner should be considered to be inverted grooves and therefore properly included within the scope of the foregoing invention. These and other modifications can be made without departing from the scope of this invention.

What is claimed is:

1. A hollow unitary plastic pallet comprising
   a. an upper surface free from reinforcing grooves and protrusions;
   b. a lower surface disposed at least 2 inches from said upper surface;

c. an exterior edge wall at least 2 inches in height extending between said upper surface and said lower surface and connecting the two surfaces;
d. legs integrally associated with said lower surface and extending downwardly from said lower surface;
e. at least one aperture through said upper and lower surfaces within the perimeter of said exterior edge wall, said aperture bounded by an interior wall extending between and connecting said upper and said lower surfaces of the pallet;
f. reinforcing grooves disposed on said lower surface extending from said apertures to said legs and downwardly along the length of said legs to their bases;
g. reinforcing grooves disposed on said lower surface extending from a leg located in proximate relationship to said exterior edge wall to an adjacent leg also located in proximate relationship to said exterior edge wall;
h. reinforcing grooves disposed on said lower surface extending from one interior side of said legs to an adjacent interior side of the same leg, and
i. reinforcing grooves disposed on each leg integrally associated with an exterior edge wall, which grooves are also integrally associated with said exterior edge wall, said grooves extending from said upper surface to the base of said legs.

2. A hollow unitary plastic pallet comprising
a. a planar upper surface free from grooves, protrusions and other surface irregularities other than holes;
b. a planar lower surface substantially parallel to said upper surface;
c. an exterior edge wall extending between and connecting said upper and lower surfaces;
d. nine legs integrally associated with said lower surface and extending downwardly from said lower surface, eight of said legs having an exterior side substantially coplanar with said exterior edge wall;
e. from 4 to 16 apertures through the upper and lower surfaces, said apertures bounded by interior walls connecting said upper and lower surfaces, said apertures being from 3 to 12 inches in diameter;
f. reinforcing grooves disposed on said lower surface extending from said apertures to said legs and downwardly along the lengths of said legs to their bases;
g. at least two reinforcing grooves disposed on each leg having an exterior side substantially coplanar with said exterior edge wall, which grooves are integrally associated with said exterior edge wall, said grooves extending from said upper surface to the base of said legs;
h. at least two reinforcing grooves disposed on the leg having no exterior edge wall;
i. reinforcing grooves disposed on said lower surface extending from each leg having an exterior side wall substantially coplanar with said exterior edge wall to an adjacent leg also having an exterior side wall substantially coplanar with said exterior edge wall; and
j. at least one reinforcing groove disposed on said lower surface extending from one interior side of each of said legs to an adjacent interior side of the same leg.

* * * * *